United States Patent
Hishinuma (10) Patent No.: US 11,990,800 B2
(45) Date of Patent: May 21, 2024

(54) MOTOR-DRIVEN COMPRESSOR

(71) Applicant: KABUSHIKI KAISHA TOYOTA JIDOSHOKKI, Kariya (JP)

(72) Inventor: Yumin Hishinuma, Kariya (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 108 days.

(21) Appl. No.: 17/857,399

(22) Filed: Jul. 5, 2022

(65) Prior Publication Data

US 2023/0007909 A1 Jan. 12, 2023

(30) Foreign Application Priority Data

Jul. 8, 2021 (JP) .................................. 2021-113570

(51) Int. Cl.
*H02K 11/33* (2016.01)
*F04C 2/02* (2006.01)

(52) U.S. Cl.
CPC .............. *H02K 11/33* (2016.01); *F04C 2/025* (2013.01); *F04C 2240/30* (2013.01); *F04C 2240/403* (2013.01); *F04C 2240/808* (2013.01)

(58) Field of Classification Search
CPC .......... F04C 2240/403; F04C 2240/808; F04C 29/045; F04C 2240/40; F04C 2240/402; F04C 23/02; F04C 29/0042; F04C 2/025; F04C 2240/30; H05K 5/0013; H05K 5/0017; H05K 5/0217; F04B 17/03; F04B 35/04; F04B 43/04; F04B 43/043;

(Continued)

(56) References Cited

U.S. PATENT DOCUMENTS 7,880,299 B2 * 2/2011 Kimura ................ H05K 7/2049
257/E23.101
9,025,334 B2 5/2015 Enami et al.
(Continued)

FOREIGN PATENT DOCUMENTS

JP   H7-29895 U   6/1995
JP   2011-67064 A  3/2011
(Continued)

*Primary Examiner* — Philip E Stimpert
*Assistant Examiner* — Dnyanesh G Kasture
(74) *Attorney, Agent, or Firm* — Sughrue Mion, PLLC (57) ABSTRACT

A motor-driven compressor includes an inverter and a housing. The inverter includes three-phase switching elements and a holder that retains the switching elements. The holder is fixed to the housing with fastening members and is configured to push the three-phase switching elements toward a heat dissipating surface of the housing. The three-phase switching elements are arranged along a line segment that connects two of the fastening members. The holder includes a first accommodating portion that accommodates one of the three-phase switching elements that is located in the middle, and two second accommodating portions that respectively accommodate two of the three-phase switching elements that are located at opposite ends. Each of the two second accommodating portions includes a tongue-shaped contact portion that contacts the corresponding switching element. The contact portions are configured to be deformed to reduce a pushing force of the holder acting on the switching elements.

8 Claims, 4 Drawing Sheets

(58) Field of Classification Search
CPC ...... F04B 43/09; F04B 45/027; F04B 45/047; F04B 45/067; F04B 45/065; F04D 13/06–13/10; F04D 25/06–25/0693; F04D 25/08–25/14; H02K 11/33; H02K 5/04; H02K 9/00
USPC .................................................. 361/807, 810
See application file for complete search history.

(56) References Cited

U.S. PATENT DOCUMENTS

| | | |
|---|---|---|
| 11,098,733 B2 | 8/2021 | Guntermann et al. |
| 2013/0021753 A1* | 1/2013 | Enami .................. H05K 7/2049 361/709 |
| 2014/0002979 A1* | 1/2014 | Leigh .................. H01R 43/205 361/749 |
| 2018/0324975 A1 | 11/2018 | Dhote et al. |

FOREIGN PATENT DOCUMENTS

| | | |
|---|---|---|
| JP | 2013-026320 A | 2/2013 |
| JP | 2019-19808 A | 2/2019 |
| JP | 2019-194075 A | 11/2019 |
| JP | 2021-92168 A | 6/2021 |

* cited by examiner

MOTOR-DRIVEN COMPRESSOR

BACKGROUND

1. Field

The present disclosure relates to a motor-driven compressor.

2. Description of Related Art

A motor-driven compressor includes a compression unit, which compresses fluid, an electric motor, which drives the compression unit, and an inverter, which drives the electric motor. The motor-driven compressor further includes a metal housing that accommodates the inverter. The inverter includes switching elements that perform a switching operation. In some cases, the inverter includes a holder made of plastic that retains the switching elements. The holder is fixed to the housing with fastening members, which are arranged on either side of the switching elements. In this configuration, the fastening force of the fastening members acts on the switching elements as a pushing force through the holder. Also, the holder receives a contact force that is a reaction from the switching elements. This bends the entire holder, so that the switching elements cannot be evenly pushed toward a heat dissipating surface of the housing. To solve this problem, for example, Japanese Laid-Open Patent Publication No. 2013-26320 discloses a configuration in which a holder includes a metal spring member. The spring member is flexibly deformed to evenly push a switching element toward a heat dissipating surface of a housing. Accordingly, the heat generated by the switching element is efficiently dissipated at the heat dissipating surface.

However, in a configuration in which a spring member pushes a switching element toward a heat dissipating surface of a housing, lead wires of a switching element may be short-circuited to each other through the metal spring member. However, if the spring member were removed, the switching element would not be evenly pushed toward the heat dissipating surface of the housing, and the heat generated by the switching element would not be efficiently dissipated at the heat dissipating surface. This problem is particularly pronounced in a configuration in which three-phase switching elements are arranged side by side between two fastening members.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a motor-driven compressor is provided that includes a compression unit configured to compress a fluid, an electric motor configured to drive the compression unit, an inverter configured to drive the electric motor, and a metal housing that accommodates the inverter. The inverter includes three-phase switching elements configured to perform switching operations, and a holder made of a plastic, the holder retaining the three-phase switching elements. The housing includes a heat dissipating surface that is thermally coupled to the three-phase switching elements. The holder is fixed to the housing with fastening members and is configured to push the three-phase switching elements toward the heat dissipating surface. The three-phase switching elements are arranged along a line segment that connects two of the fastening members. The holder includes a first accommodating portion that accommodates one of the three-phase switching elements that is located in a middle, and two second accommodating portions that respectively accommodate two of the three-phase switching elements that are located at opposite ends. Each of the two second accommodating portions includes a tongue-shaped contact portion. The contact portion contacts the corresponding switching element. The contact portions are configured to be deformed to reduce a pushing force of the holder acting on the switching elements.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

A motor-driven compressor 10 according to an embodiment will now be described with reference to FIGS. 1 to 4. The motor-driven compressor 10 of the present embodiment is used, for example, in a vehicle air conditioner 23, which will be discussed below.

Overall Configuration of Motor-Driven Compressor 10

Figure 1:
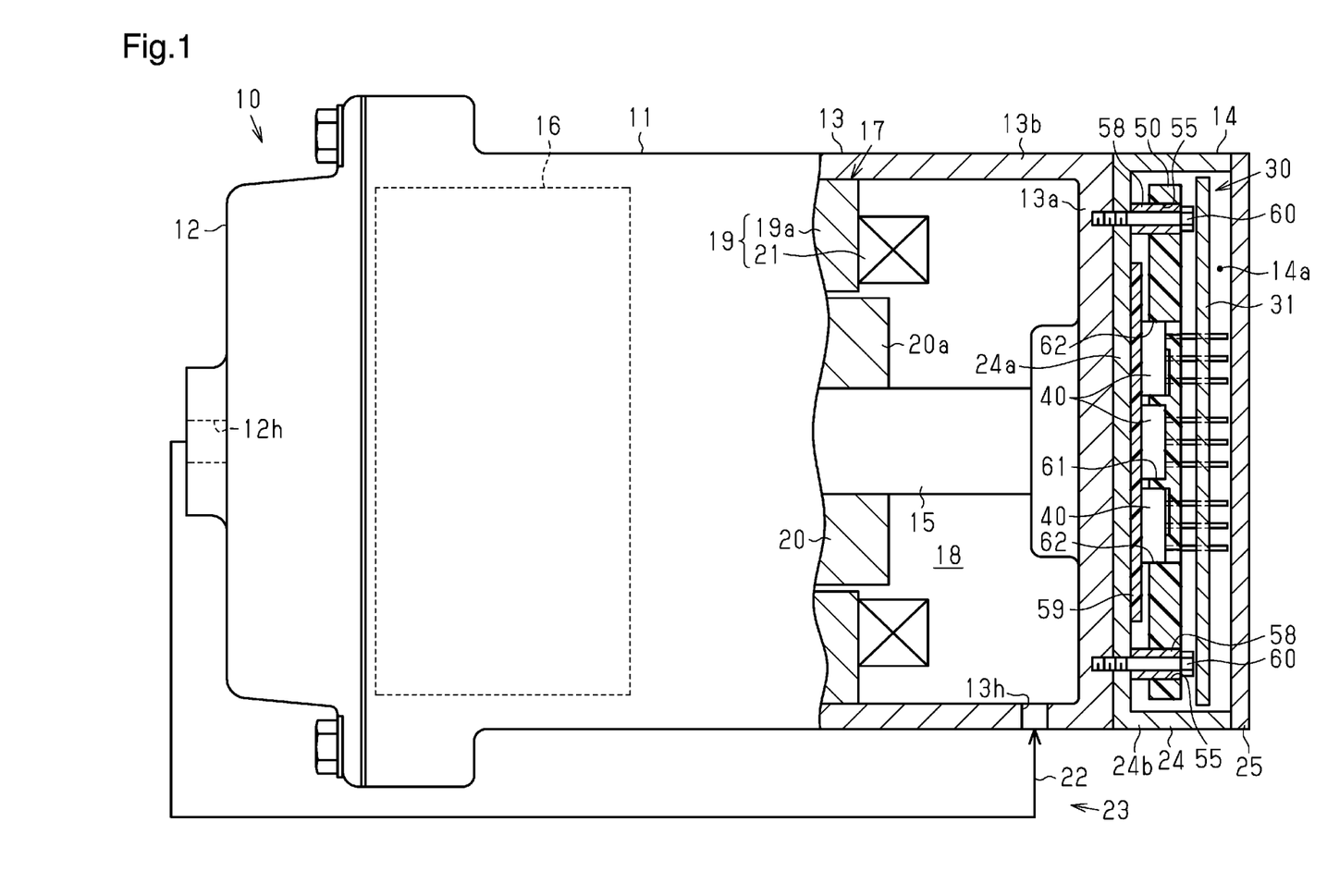
FIG. 1 is a partially cut away cross-sectional side view showing a motor-driven compressor according to an embodiment.

As shown in FIG. 1, the motor-driven compressor 10 includes a housing 11. The housing 11 includes a discharge housing member 12, a motor housing member 13, and an inverter case 14. The discharge housing member 12, the motor housing member 13, and the inverter case 14 are made of metal such as aluminum. The housing 11 is thus made of metal. The discharge housing member 12 is tubular. The motor housing member 13 is coupled to the discharge housing member 12. The motor housing member 13 has a plate-shaped end wall 13a and a tubular peripheral wall 13b, which extends from the outer periphery of the end wall 13a.

The motor housing member 13 accommodates a rotary shaft 15. The motor housing member 13 accommodates a compression unit 16 and an electric motor 17. The compression unit 16 is driven by rotation of the rotary shaft 15 so as to compress refrigerant, which is a fluid. The electric motor 17 rotates the rotary shaft 15 so as to drive the compression unit 16. The compression unit 16 and the electric motor 17 are arranged in an axial direction, in which the rotation axis of the rotary shaft 15 extends. The electric motor 17 is located closer to the end wall 13a of the motor housing member 13 than the compression unit 16. That is, the electric motor 17 is arranged between the compression unit 16 and the end wall 13a. The motor housing member 13 includes a motor chamber 18 between the compression unit 16 and the end wall 13a. The motor chamber 18 accommodates the electric motor 17.

The compression unit 16 is, for example, of a scroll type that includes a fixed scroll (not shown) fixed in the motor housing member 13 and a movable scroll (not shown) opposed to the fixed scroll.

The electric motor 17 includes a tubular stator 19 and a rotor 20, which is arranged on the inner side of the stator 19. The rotor 20 rotates integrally with the rotary shaft 15. The stator 19 surrounds the rotor 20. The rotor 20 includes a rotor core 20a, which is fixed to the rotary shaft 15, and permanent magnets (not shown), which are provided on the rotor core 20a. The stator 19 includes a tubular stator core 19a and a motor coil 21, which is wound about the stator core 19a.

The peripheral wall 13b has a suction port 13h. The suction port 13h is formed in a part of the peripheral wall 13b that is relatively close to the end wall 13a. The suction port 13h is continuous with the motor chamber 18. The suction port 13h is connected to an end of an external refrigerant circuit 22. The discharge housing member 12 has a discharge port 12h. The discharge port 12h is connected to another end of the external refrigerant circuit 22.

Refrigerant that has been drawn into the motor chamber 18 from the external refrigerant circuit 22 through the suction port 13h is compressed by the compression unit 16 when the compression unit 16 operates. The compressed refrigerant flows out to the external refrigerant circuit 22 through the discharge port 12h. The refrigerant that has flowed out to the external refrigerant circuit 22 flows through a heat exchanger and an expansion valve of the external refrigerant circuit 22 and then returns to the motor chamber 18 through the suction port 13h. The motor-driven compressor 10 and the external refrigerant circuit 22 form the vehicle air conditioner 23.

The inverter case 14 is attached to the end wall 13a of the motor housing member 13. The inverter case 14 has an inverter accommodating chamber 14a, which accommodates an inverter 30. The housing 11 thus has the inverter accommodating chamber 14a and incorporates the inverter 30. The compression unit 16, the electric motor 17, and the inverter 30 are arranged in that order in the axial direction of the rotary shaft 15.

Figure 2:
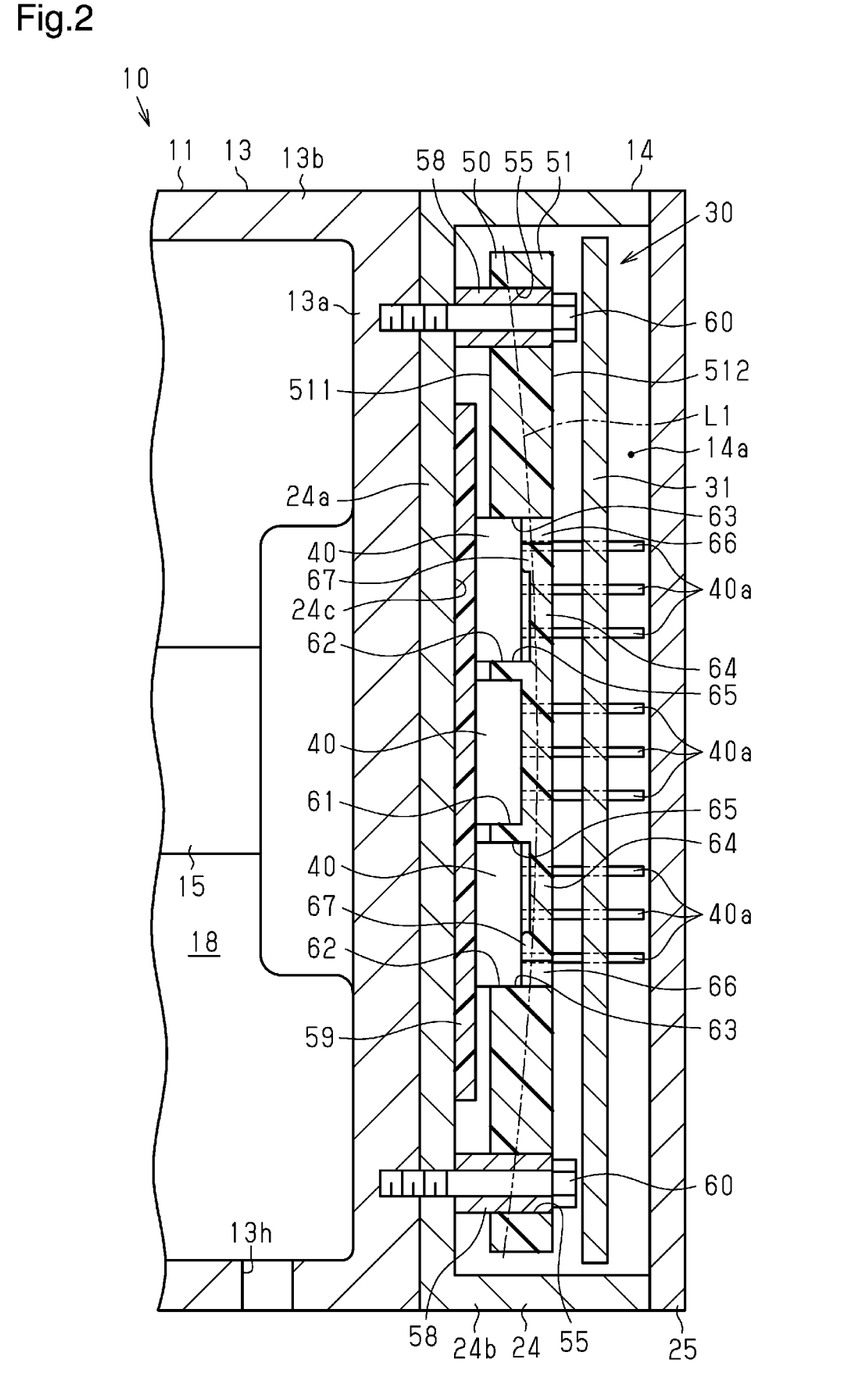
FIG. 2 is an enlarged cross-sectional view showing part of the motor-driven compressor of FIG. 1.

As shown in FIG. 2, the inverter case 14 includes a case body 24 and a lid member 25. The case body 24 includes a plate-shaped case end wall 24a and a tubular case peripheral wall 24b, which extends from the outer periphery of the case end wall 24a. The lid member 25 has the shape of a plate. The lid member 25 is coupled to the case body 24 while closing the opening of the case peripheral wall 24b. The inverter accommodating chamber 14a is defined by the case body 24 and the lid member 25.

Configuration of Inverter 30

The inverter 30 drives the electric motor 17. The inverter 30 includes a circuit board 31. The circuit board 31 is accommodated in the inverter accommodating chamber 14a. The inverter 30 includes three-phase switching elements 40. The three-phase switching elements 40 are mounted on the circuit board 31. The switching elements 40 perform a switching operation to drive the electric motor 17. Switching elements 40 that respectively form upper arms of a U-phase, a V-phase, and a W-phase, and switching elements 40 that respectively form lower arms of the U-phase, the V-phase, and the W-phase are mounted on the circuit board 31. Accordingly, the inverter 30 of the present embodiment includes two sets of three-phase switching elements 40. Thus, six switching elements 40 are mounted on the circuit board 31 of the present embodiment.

The inverter 30 includes a holder 50 made of plastic. The holder 50 retains the three-phase switching elements 40. The holder 50 is accommodated in the inverter accommodating chamber 14a. The holder 50 is thus accommodated in the housing 11. The holder 50 also retains other devices such as a capacitor and a coil (neither is shown). The capacitor is a filter element that reduces noise included in input current from the outside. The coil forms a filter circuit together with the capacitor.

Configuration of Holder 50

Figure 3:
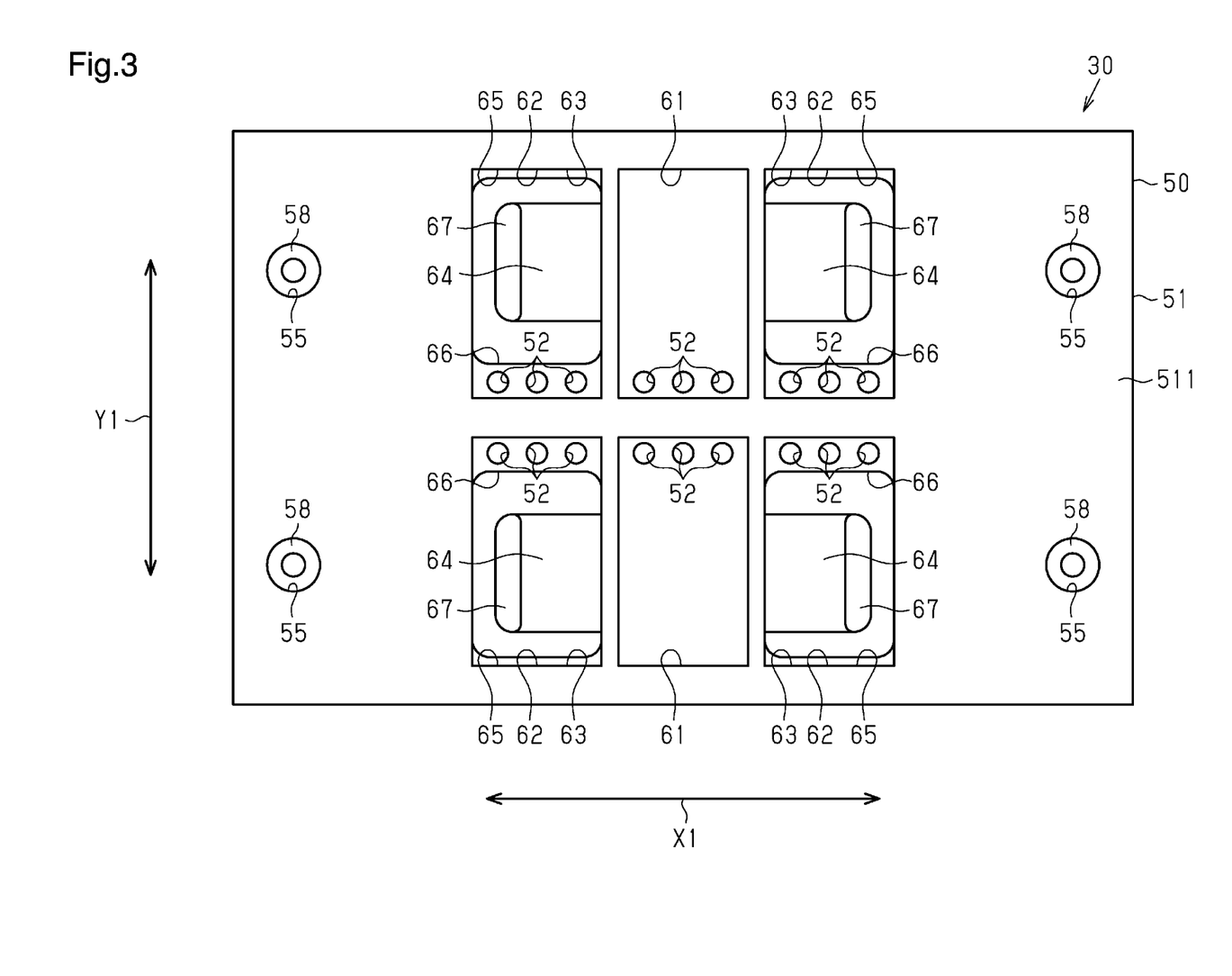
FIG. 3 is a plan view of a holder shown in FIG. 2.
Figure 4:
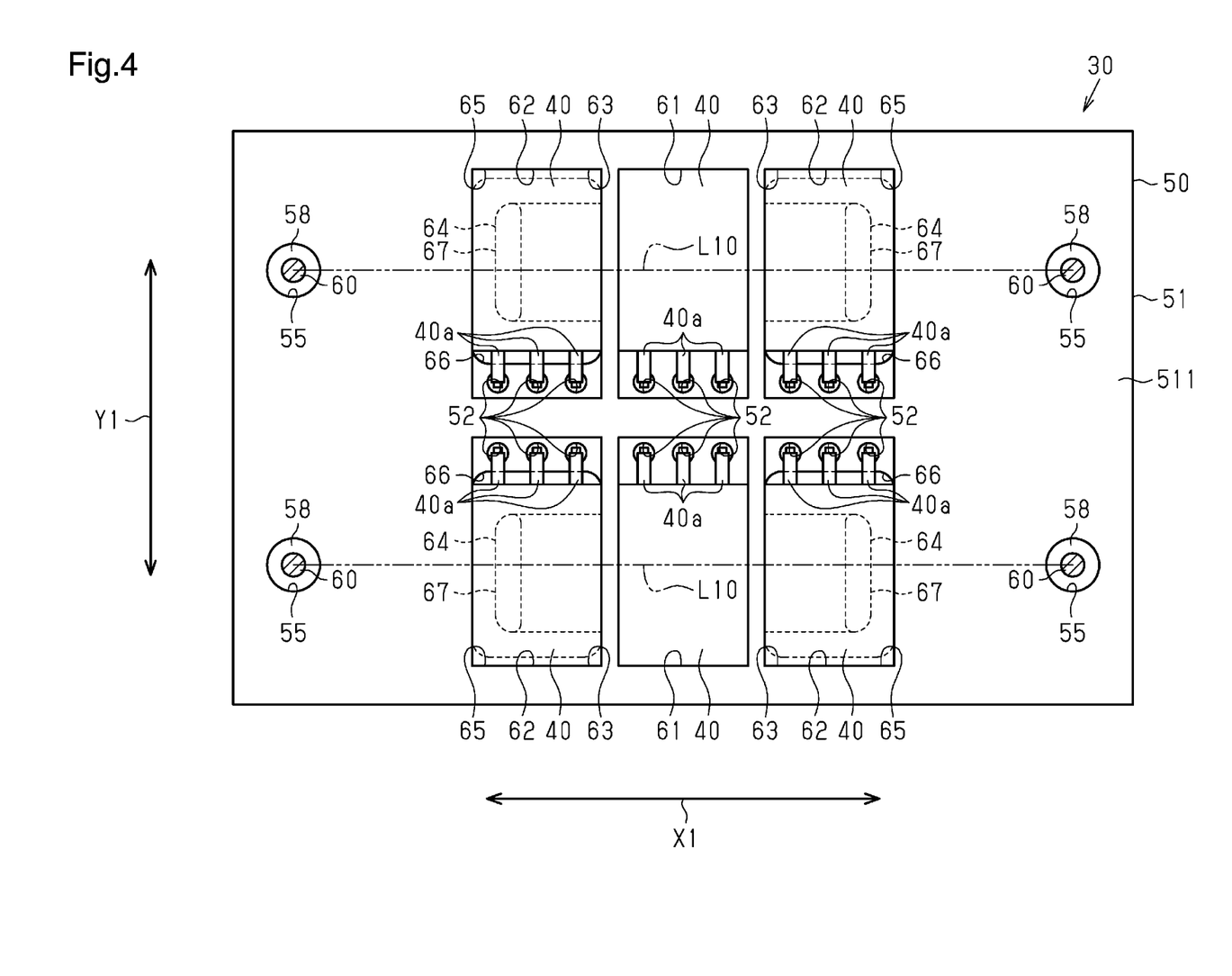
FIG. 4 is a cross-sectional view showing a state in which the switching elements shown in FIG. 3 are retained by the holder.

As shown in FIGS. 2, 3, and 4, the holder 50 includes a plate-shaped holder body 51. The holder body 51 has a substantially rectangular shape in plan view. The holder body 51 has a first surface 511 and a second surface 512, which face in opposite directions from each other in the thickness direction of the holder body 51. In plan view of the first surface 511, a direction that is orthogonal to the thickness direction of the holder body 51 is defined as a first direction X1. In plan view of the first surface 511 of the holder body 51, a direction that is orthogonal to the thickness direction of the holder body 51 and to the first direction X1 is defined as a second direction Y1.

The holder body 51 has one first accommodating portion 61 and two second accommodating portions 62. In the present embodiment, the holder 50 has two sets of one first accommodating portion 61 and two second accommodating portions 62. In each set, the first accommodating portion 61 and the two second accommodating portions 62 are arranged in the first direction X1. In each set, the first accommodating portion 61 is arranged between the two second accommodating portions 62 in the first direction X1. The first accommodating portion 61 is thus located between the two second accommodating portions 62 in the first direction X1.

Each of the first accommodating portion 61 and the second accommodating portions 62 in each set accommodates one of the three-phase switching elements 40. Accordingly, the three-phase switching elements 40 in each set are arranged in the first direction X1. The first accommodating portion 61 accommodates one of the three-phase switching elements 40 that is located in the middle. The two second accommodating portions 62 respectively accommodate two of the three-phase switching elements 40 that are located at the opposite ends.

The two sets of the accommodating portions are arranged in the second direction Y1 on the first surface 511 of the holder body 51. The first accommodating portion 61 and the second accommodating portions 62 in a first set are arranged at one side in the second direction Y1 on the first surface 511. The first accommodating portion 61 and the second accommodating portions 62 in a second set are arranged at another side in the second direction Y1 on the first surface 511.

Description related to the first accommodating portion 61 and the second accommodating portions 62 in the first set is substantially the same as description related to the first accommodating portion 61 and the second accommodating portions 62 in the second set. Accordingly, the first accommodating portion 61 and the second accommodating portions 62 in the first set will be described. Regarding the first accommodating portion 61 and the second accommodating portions 62 in the second set, the same reference numerals as in the first set will be used, and redundant explanations will be omitted.

As shown in FIGS. 3 and 4, the holder body 51 has bolt insertion holes 55. Two of the bolt insertion holes 55 are arranged at positions on either side in the first direction X1 of the first accommodating portion 61 and the two second accommodating portions 62. That is, the two bolt insertion holes 55 are arranged at the opposite sides in the first direction X1 of the first accommodating portion 61 and the two second accommodating portions 62. Bolts 60, which are fastening members, are passed through the corresponding bolt insertion holes 55. As shown in FIG. 4, the three-phase switching elements 40 are arranged along a line segment L10, which connects two of the bolts 60. The three-phase switching elements 40 are arranged between the two bolts 60. The two second accommodating portions 62 respectively accommodate two of the three-phase switching elements 40 that are located at the opposite ends. The first accommodating portion 61 accommodates one of the three-phase switching elements 40 that is located in the middle. Each of the second accommodating portions 62 is arranged between the first accommodating portion 61 and one of the two bolts 60.

As shown in FIG. 2, a cylindrical collar member 58 is press-fitted in each bolt insertion hole 55. One of the end faces in the axial direction of each collar member 58 projects from the first surface 511 of the holder body 51. The bolt 60 can be passed through each collar member 58.

The holder 50 is arranged in relation to the case end wall 24a of the case body 24 with the collar members 58 contacting the case end wall 24a. Each bolt 60, which is passed through each collar member 58, extends through the case end wall 24a and is threaded into the end wall 13a of the motor housing member 13. This attaches the holder 50 and the case body 24 in a unitized state to the end wall 13a of the motor housing member 13. As such, the holder 50 is fixed to the housing 11 with the bolts 60.

The switching elements 40 are thermally coupled to the inner surface of the case end wall 24a of the case body 24 with an insulating sheet 59 between them. Thus, the inner surface of the case end wall 24a of the case body 24 forms a heat dissipating surface 24c, which is thermally coupled to the three-phase switching elements 40. Therefore, the housing 11 includes the heat dissipating surface 24c, which is thermally coupled to the three-phase switching elements 40.

As shown in FIG. 4, the switching elements 40 are accommodated in the first accommodating portion 61 and the second accommodating portions 62 with lead wires 40a of each switching element 40 inserted into lead insertion holes 52 formed in the holder 50. As shown in FIG. 2, the distal end of each lead wire 40a is electrically connected to the circuit board 31. The distal end of each lead wire 40a is, for example, soldered to the circuit board 31.

Configuration of First Accommodating Portion 61

As shown in FIGS. 3 and 4, the first accommodating portion 61 is formed in the first surface 511 of the holder body 51. The first accommodating portion 61 is a recess in the first surface 511 of the holder body 51. The inner peripheral edge of the first accommodating portion 61 extends along the outer surface of the switching element 40. The first accommodating portion 61 is formed in the holder 50 such that the switching element 40 is surrounded by the inner peripheral edge of the first accommodating portion 61. The bottom surface of the first accommodating portion 61 is flat. The bottom surface of the first accommodating portion 61 is in contact with the switching element 40. The first accommodating portion 61 accommodates one of the three-phase switching elements 40 that is located in the middle and pushes it toward the heat dissipating surface 24c.

Configuration of Two Second Accommodating Portions 62

Each second accommodating portion 62 has a through-hole 63 and a contact portion 64. The through-hole 63 extends through the holder body 51 in the thickness direction. The through-hole 63 includes a large hole portion 65 and a small hole portion 66. The large hole portion 65 is a rectangular hole and is recessed from the first surface 511 of the holder body 51. The inner peripheral edge of the large hole portion 65 extends along the outer surface of the switching element 40. Thus, the through-hole 63 is formed in the holder 50 such that the switching element 40 is surrounded by the inner peripheral edge of the through-hole 63.

The small hole portion 66 is formed in the bottom surface of the large hole portion 65. The small hole portion 66 is continuous with the large hole portion 65. The small hole portion 66 extends through the holder body 51. As shown in FIG. 2, the small hole portion 66 opens in the second surface 512 of the holder body 51. The small hole portion 66 is formed in the holder 50 so as to overlap with the switching element 40 accommodated in the second accommodating portion 62 in the thickness direction of the holder body 51.

As shown in FIGS. 3 and 4, the contact portion 64 has the shape of a tongue. The contact portion 64 has the shape of a thin rectangular plate. The contact portion 64 is thinner than the holder body 51. The contact portion 64 is provided inside the through-hole 63. The contact portion 64 extends from the first accommodating portion 61 toward the corresponding bolt 60. Specifically, the contact portion 64 extends from a portion of the inner peripheral edge of the through-hole 63 adjacent to the first accommodating portion 61 toward the corresponding bolt 60. The outer peripheral edge of the contact portion 64 extends along the small hole portion 66. The small hole portion 66 thus extends so as to surround the outer peripheral edge of the contact portion 64. The contact portion 64 includes a proximal end that is continuous with an edge of the small hole portion 66 in the vicinity of the first accommodating portion 61. The edge of the small hole portion 66 thus extends to a position that is continuous with the proximal end of the contact portion 64.

The contact portion 64 is elastically deformable so as to be bent about the proximal end of the contact portion 64. The proximal end of the contact portion 64 is a fixed end, and the distal end of the contact portion 64 is a free end. The proximal end of the contact portion 64 is continuous with the inner peripheral edge of the through-hole 63. The contact portion 64 has a protrusion 67 at the distal end. The protrusion 67 protrudes from the distal end of the contact portion 64 toward the first surface 511 of the holder body 51. The protruding end face of the protrusion 67 is flat. The protrusion 67 is in contact with the switching element 40.

The protrusion 67 is thus in contact with the switching element 40, while projecting toward the heat dissipating surface 24c.

Therefore, the contact portion 64 extends from the portion of the inner peripheral edge of the through-hole 63 adjacent to the first accommodating portion 61 into the through-hole 63 and is in contact with the switching element 40. As described above, the two second accommodating portions 62 respectively accommodate two of the three-phase switching elements 40 that are located at the opposite ends and push the two switching elements 40 toward the heat dissipating surface 24c. The holder 50 thus pushes the three-phase switching elements 40 toward the heat dissipating surface 24c. The contact portions 64 are deformed to reduce the pushing force of the holder 50 acting on the switching elements 40.

Operation

Operation of the present embodiment will now be described.

Direct-current voltage from an external power source is converted into alternating-current voltage by the switching elements 40, and the converted alternating-current voltage is supplied to the electric motor 17 as driving voltage. This drives the electric motor 17. The rotary shaft 15 rotates as the electric motor 17 is driven, and rotation of the rotary shaft 15 drives the compression unit 16, which in turn compresses refrigerant.

The bolts 60 apply, to the holder 50, a fastening force with which the holder 50 is fastened to the end wall 13a of the motor housing member 13. The fastening force of the bolts 60 bends the holder body 51 such that portions of the holder body 51 surrounding the bolts 60 approach the end wall 13a of the motor housing member 13. In FIG. 2, such bending of the holder body 51 is hypothetically illustrated by a long-dash double-short-dash line L1. Parts of the holder 50 around the bolts 60 are likely to be deformed toward the heat dissipating surface 24c by the fastening force of the bolts 60.

For example, when the fastening force of the bolts 60 deforms the second accommodating portion 62 toward the heat dissipating surface 24c, the entire holder 50 is bent. This deforms the first accommodating portion 61 away from the heat dissipating surface 24c. As a result, the switching element 40 at the center is unlikely to be pushed toward the heat dissipating surface 24c by the first accommodating portion 61. Accordingly, the heat generated by the switching element 40 cannot be dissipated efficiently.

Each second accommodating portion 62 has a contact portion 64, which has the shape of a tongue. Since the tongue-shaped contact portions 64 are deformed to return to the original state when the holder 50 is bent as a whole, the pushing force acting on the two switching elements 40 at the opposite ends is reduced. At the same time, since the first accommodating portion 61 is unlikely to be deformed away from the heat dissipating surface 24c, the switching element 40 at the center is readily pushed toward the heat dissipating surface 24c by the first accommodating portion 61. This increases the force with which the first accommodating portion 61 pushes the switching element 40 toward the heat dissipating surface 24c. As a result, the heat generated by the switching element 40 is efficiently dissipated at the heat dissipating surface 24c.

Advantages

The above-described embodiment has the following advantages.

(1) Each second accommodating portion 62 includes a tongue-shaped contact portion 64, which contacts the switching element 40. The contact portion 64 is part of the holder 50, which is made of a plastic. Since the tongue-shaped contact portions 64 are deformed to return to the original state when the holder 50 is bent as a whole, the pushing force acting on the two switching elements 40 at the opposite ends is reduced. At the same time, since the first accommodating portion 61 is unlikely to be deformed away from the heat dissipating surface 24c, the switching element 40 at the center is readily pushed toward the heat dissipating surface 24c by the first accommodating portion 61. This increases the force with which the first accommodating portion 61 pushes the switching element 40 toward the heat dissipating surface 24c. As a result, the heat generated by the switching element 40 is efficiently dissipated at the heat dissipating surface 24c.

It is thus not necessary to push all the switching elements 40 toward the heat dissipating surface 24c with spring members. Therefore, the lead wires 40a of the switching elements 40 are prevented from being short-circuited to each other through spring members, unlike a case in which the switching elements 40 are pushed toward the heat dissipating surface 24c with spring members. Accordingly, the present embodiment dissipates the heat generated by the switching elements 40 efficiently, while ensuring an insulation property of the switching elements 40.

(2) Each second accommodating portion 62 includes a through-hole 63, which surrounds the switching element 40. A contact portion 64 is provided inside the through-hole 63 and extends toward the corresponding bolt 60 from the portion of the inner peripheral edge of the through-hole 63 adjacent to the first accommodating portion 61. Specifically, a contact portion 64 is provided inside the through-hole 63 and extends toward the corresponding bolt 60 from the side of the accommodating portion 62 adjacent to the first accommodating portion 61. With this configuration, the contact portion 64 extends from a position relatively close to the first accommodating portion 61. This allows the first accommodating portion 61 and the contact portion 64 to evenly apply a pushing force to the switching elements 40.

(3) The contact portion 64 includes, at the distal end, a protrusion 67, which protrudes toward the heat dissipating surface 24c and is in contact with the switching element 40. As compared to a case in which the contact portion 64 does not include the protrusion 67 at the distal end, the switching element 40 is readily pushed toward the heat dissipating surface 24c by the contact portion 64. Specifically, for example, if the proximal end of the contact portion 64 contacted the switching element 40 before the distal end of the contact portion 64, the contact portion 64 would be unlikely to be elastically deformed. Since the contact portion 64 has the protrusion 67 at the distal end, the protrusion 67 contacts the switching element 40 before the proximal end of the contact portion 64. The switching element 40 is thus readily pushed toward the heat dissipating surface 24c by the contact portion 64. Accordingly, the heat generated by the switching element 40 is dissipated further efficiently.

(4) With the present embodiment, it is not necessary to use spring members to push the switching elements 40 toward the heat dissipating surface 24c in order to efficiently dissipate the heat generated by the switching elements 40. This reduces the number of components.

(5) The pushing force with which the contact portion 64 pushes the switching element 40 toward the heat dissipating surface 24c can be adjusted by adjusting the length of the contact portion 64 from the first accommodating portion 61. Specifically, the pushing force with which the contact portion 64 pushes the switching element 40 toward the heat dissipating surface 24c can be adjusted by adjusting the length from the fixed end to the free end of the contact portion 64.

Modifications

The above-described embodiment may be modified as follows. The above-described embodiment and the following modifications can be combined as long as the combined modifications remain technically consistent with each other.

In the above-described embodiment, the contact portion 64 does not necessarily need to have the shape of a thin rectangular plate. The contact portion 64 may be modified as long as it is provided inside the through-hole 63 and has the shape of a tongue extending from the portion of the inner peripheral edge of the through-hole 63 adjacent to the first accommodating portion 61 toward the bolt 60.

In the above-described embodiment, the protruding end face of the protrusion 67 does not necessarily need to be flat. The shape of the protrusion 67 is not particularly limited as long as the protrusion 67 is allowed to contact the switching element 40.

In the above-described embodiment, the contact portion 64 does not necessarily need to have a protrusion 67 at the distal end.

In the above-described embodiment, the through-hole 63 does not necessarily need to have the large hole portion 65, but may be formed, for example, only with the small hole portion 66. In this case, the inner peripheral edge of the small hole portion 66 extends along the outer surface of the switching element 40. In this manner, the through-hole 63 may be formed in the holder 50 such that the switching element 40 is surrounded by the inner peripheral edge of the through-hole 63.

In the above-described embodiment, press-fit pins that are press-fitted into the housing 11 may be used as the fastening members used to fix the holder 50 to the housing 11. That is, the fastening members used to fix the holder 50 to the housing 11 are not limited to the bolts 60.

In the above-described embodiment, for example, a cover member may be attached to the end wall 13a of the motor housing member 13, such that the end wall 13a of the motor housing member 13 and the cover member define the inverter accommodating chamber 14a. In this case, an end face of the end wall 13a that faces the inverter accommodating chamber 14a functions as a heat dissipating surface that is thermally coupled to the three-phase switching elements 40.

In the above-described embodiment, the motor-driven compressor 10 may be configured such that, for example, the inverter 30 is arranged to be on the outer side of the rotary shaft 15 in the radial direction in the housing 11. That is, the compression unit 16, the electric motor 17, and the inverter 30 do not necessarily need to be arranged in that order in the axial direction of the rotary shaft 15.

In the above-described embodiment, the compression unit 16 is not limited to a scroll type, but may be, for example, a piston type or a vane type.

In the above-described embodiment, the motor-driven compressor 10 is used in the vehicle air conditioner 23. However, the motor-driven compressor 10 may be used in other apparatuses. For example, the motor-driven compressor 10 may be mounted on a fuel cell electric vehicle and use the compression unit 16 to compress air, which is a fluid supplied to the fuel cell.

"Tubular" shapes as used in the present description include, but are not limited to, any structure having circular cross-sectional shape, an elliptic cross-sectional shape, and a polygonal cross-sectional shape with sharp or rounded corners.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A motor-driven compressor, comprising:
   a compression unit configured to compress a fluid;
   an electric motor configured to drive the compression unit;
   an inverter configured to drive the electric motor; and
   a metal housing that accommodates the inverter, wherein
   the inverter includes:
      three-phase switching elements configured to perform switching operations; and
      a holder made of a plastic, the holder retaining the three-phase switching elements,
   the housing includes a heat dissipating surface that is thermally coupled to the three-phase switching elements,
   the holder is fixed to the housing with fastening members and is configured to push the three-phase switching elements toward the heat dissipating surface,
   the three-phase switching elements are arranged along a line segment that connects two of the fastening members,
   the holder includes:
      a first accommodating recess that directly contacts and at least partially receives one of the three-phase switching elements that is located in a middle; and
      two second accommodating recesses that directly contact and at least partially receive two of the three-phase switching elements respectively that are located at opposite ends of said one of the three-phase switching elements,
   each of the two second accommodating portions includes a tongue-shaped contact portion, the contact portion contacting a corresponding switching element, and
   the contact portions are configured to be deformed to reduce a pushing force of the holder acting on the switching elements.

2. The motor-driven compressor according to claim 1, wherein
   each second accommodating recess includes a through-hole that surrounds the corresponding switching element,
   each contact portion is provided inside a corresponding through hole, and
   each contact portion extends from a portion of an inner peripheral edge of the through-hole adjacent to the first accommodating portion toward a corresponding fastening member.

3. The motor-driven compressor according to claim 2, wherein the fastening members include a first fastening member and a second fastening member, one of the two second accommodating recesses is arranged between the first accommodating recess and the first fastening member, the contact portion of the one of the second accommodating recesses extending from the portion of the inner peripheral edge of the corresponding through-hole adjacent to the first accommodating recess toward the first fastening member, and an other of the two second accommodating recesses is arranged between the first accommodating recess and the second fastening member, the contact portion of the other of the second accommodating recess extending from the portion of the inner peripheral edge of the corresponding through-hole adjacent to the first accommodating recess toward the second fastening member.

4. The motor-driven compressor according to claim 1, wherein each contact portion includes a protrusion at a distal end, the protrusion protruding toward the heat dissipating surface and being in contact with the corresponding switching element.

5. The motor-driven compressor according to claim 1, wherein each second accommodating recess includes a through-hole that surrounds the corresponding switching element, each contact portion is provided inside a corresponding through-hole, and each contact portion includes:

a fixed end that is continuous with an inner peripheral edge of the corresponding through-hole; and a free end on a side opposite to the fixed end.

6. The motor-driven compressor according to claim 5, wherein each contact portion is configured to be bendable about the fixed end.

7. The motor-driven compressor according to claim 5, wherein each contact portion includes a protrusion at the free end, the protrusion protruding toward the heat dissipating surface and being in contact with the corresponding switching element.

8. The motor-driven compressor according to claim 5, wherein the fastening members include a first fastening member and a second fastening member, one of the two second accommodating recesses is arranged between the first accommodating recess and the first fastening member, the contact portion of the one of the second accommodating recesses extending from a portion of the inner peripheral edge of the corresponding through-hole adjacent to the first accommodating recess toward the first fastening member, and an other of the two second accommodating recesses is arranged between the first accommodating recess and the second fastening member, the contact portion of the other of the second accommodating recesses extending from a portion of the inner peripheral edge of the corresponding through-hole adjacent to the first accommodating recess toward the second fastening member.

* * * * *